United States Patent [19]
Seelig et al.

[11] 3,864,122
[45] Feb. 4, 1975

[54] METHOD FOR PRODUCING STEEL

[75] Inventors: Henri R. Seelig, Essen; Ritter Von Waclawiczek, Duisburg, both of Germany

[73] Assignee: Fried. Krupp Gesellschaft mit beschrankter Haftung, Essen, Germany

[22] Filed: May 19, 1972

[21] Appl. No.: 255,150

[30] Foreign Application Priority Data
May 29, 1971 Germany............................ 2126803

[52] U.S. Cl................................. 75/11, 75/3, 75/38
[51] Int. Cl....... C21c 5/52, C21b 1/08, C21b 13/14
[58] Field of Search ................ 75/11, 26, 34, 38, 39

[56] References Cited
UNITED STATES PATENTS

| | | | |
|---|---|---|---|
| 2,805,930 | 9/1957 | Udy | 75/11 |
| 2,894,831 | 7/1957 | Old | 75/26 |
| 2,978,315 | 4/1961 | Schenck | 75/9 |
| 3,140,168 | 7/1964 | Halley | 75/26 |
| 3,145,094 | 8/1964 | Nakajima | 75/38 |
| 3,163,520 | 12/1964 | Collin | 75/11 |
| 3,224,871 | 12/1965 | Collin | 75/11 |
| 3,295,952 | 1/1967 | Johnson | 75/3 |
| 3,374,087 | 3/1968 | Gray | 75/26 |
| 3,495,971 | 2/1970 | Ban | 75/3 |

FOREIGN PATENTS OR APPLICATIONS
828,314   2/1960   Great Britain.......................... 75/26

*Primary Examiner*—L. Dewayne Rutledge
*Assistant Examiner*—Peter D. Rosenberg
*Attorney, Agent, or Firm*—Spencer & Kaye

[57] ABSTRACT

A method for producing steel, including flowing a reducing gas through a plurality of jacket-heated shaft-furnace units containing iron ore pellets, always from a shaft-furnace unit containing iron ore pellets in a more advanced stage of reduction to a shaft-furnace unit containing iron ore pellets in a less advanced stage of reduction, for directly reducing the iron ore pellets with the reducing gas; withdrawing iron ore pellets, which are reduced to completion, from the plurality of shaft-furnace units; protecting the withdrawn pellets with at least a part of the reducing gas from the last of the shaft-furnace units through which the reduction gas flows; and feeding the withdrawn pellets and protecting reducing gas together into an electric furnace.

8 Claims, 2 Drawing Figures

METHOD FOR PRODUCING STEEL

BACKGROUND OF THE INVENTION

The present invention relates to a method for producing steel from iron ore pellets by direct reduction in jacket-heated shaft-furnaces using cracked gas and subsequent melting in an electric furnace.

The known methods of this type have in general the disadvantage that there is an under-utilization of the cracked gas used for reducing. This is a result of the varying conditions in the separate reducing stages. Moreover, there are always considerable difficulties in getting the reduced sponge iron from the shaft furnace into the electric furnace without a reoxidation and without heat losses. Thus, a perfect sealing of the transfer locations with economical means is scarcely possible and, for practical reasons, one cannot go below a certain minimum separation between the two furnaces. When the reduced sponge iron cannot be screened from the air, it must then first be cooled down to a temperature at which reoxidation will no longer proceed. Then, for melting, the lost heat must be resupplied.

SUMMARY OF THE INVENTION

An object of the present invention, therefore, is to provide a method of producing steel avoiding the above disadvantages.

This as well as other objects which will become apparent in the discussion that follows are achieved, according to the present invention, by a method for producing steel, including the steps of: flowing a reducing gas through a plurality of jacket-heated shaft-furnace units containing iron ore pellets, always from a shaft-furnace unit containing iron ore pellets in a more advanced stage of reduction to a shaft-furnace unit containing iron ore pellets in a less advanced stage of reduction, for directly reducing the iron ore pellets with the reducing gas; withdrawing iron ore pellets, which are reduced to completion, from the plurality of shaft-furnace units; protecting the withdrawn pellets with at least a part of the reducing gas from the last of the shaft-furnace units through which the reducing gas flows in the step of flowing; and feeding the withdrawn pellets and protecting reducing gas together into an electric furnace.

GENERAL ASPECTS OF THE INVENTION

Thus, according to the present invention, iron ore pellets are reduced in stages in a plurality of furnace units, with cracked gas, as reducing gas, flowing countercurrent through the furnace units, being conducted always from a furnace unit having a more advanced stage of reduction to a preceding furnace unit having a less advanced stage of reduction, and, after passing through all furnace units, being fed at least partly into an electric furnace together with pellets which have been reduced to completion.

The reduction in stages yields a very favorable exploitation of the cracked gas. Furthermore, the reducing process is well suited for control and regulation. Reoxidation and cooling of pellets which have been reduced to completion is simply and economically prevented.

The method of the present invention is especially suited for cooperation with a nuclear reactor. The heat carrying medium of the reactor circulatory system can be used both for producing the cracked gas (consisting essentially of carbon monoxide and hydrogen) and for the heating of the jackets of the shaft-furnace units.

A plant for carrying out the method of the invention is so formed that at least two shaft-furnace units are connected directly to an electric furnace. The two furnace units are arranged in parallel with respect to the flow of pellets and in series with respect to flow of cracked gas. The order of the two furnaces in the series connection may be reversed.

Another plant for carrying out the method of the invention is so constructed, that at least two shaft-furnace units are positioned one above the other in series, with the lower furnace unit being connected directly to the electric furnace.

The method, together with the plants for carrying it out, provide an especially economical, trouble-free and continuous steel production.

DESCRIPTION OF THE PREFERRED EMBODIMENTS

In the Figures, like structures are indicated with the same numerals.

Figure 1:
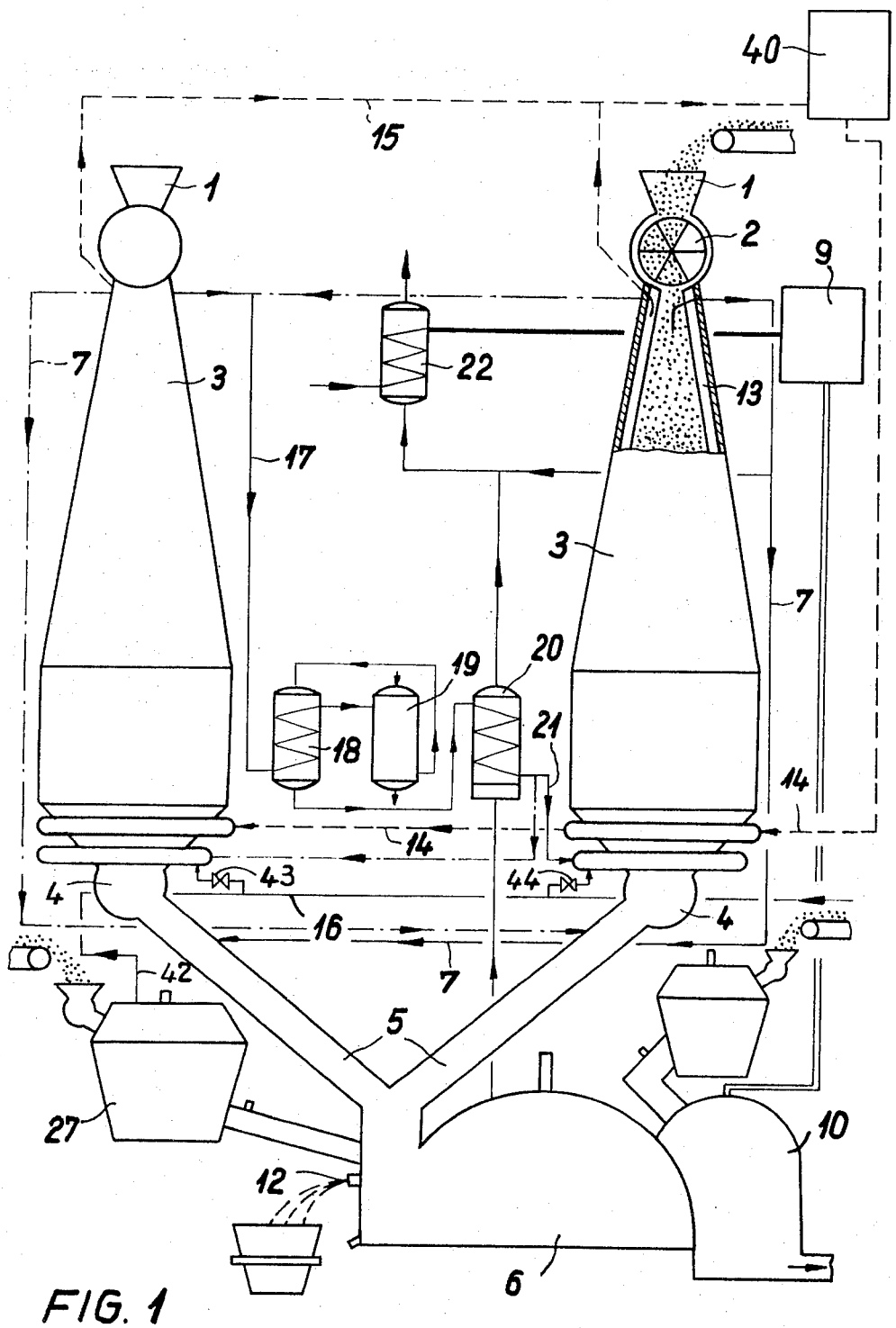
FIG. 1 is a flow diagram of a plant according to the invention having two shaft furnaces situated alongside one another and arranged in parallel with respect to pellet flow.
Figure 2:
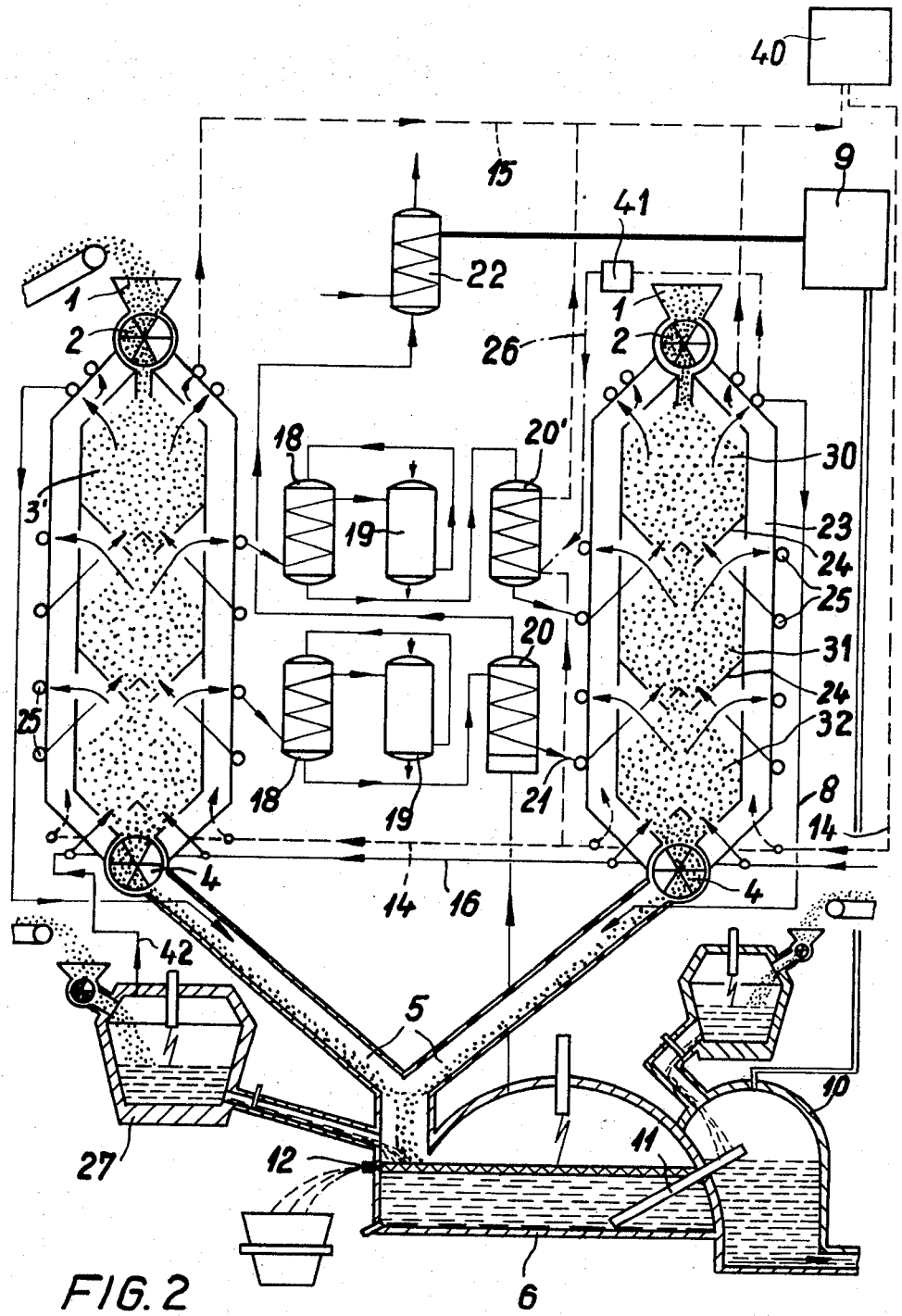
FIG. 2 is a flow diagram of a plant of the invention wherein shaft-furnace units are arranged one above the other and are provided with common jackets.

Referring firstly to both Figures, iron ore pellets, which may be already in a partially reduced state, are fed into the shaft-furnace units 3 in FIG. 1 and the shaft-furnace units 30 in FIG. 2 through hopper 1 and metering device 2. In FIG. 1, pellets reduced to completion are eventually withdrawn through metering devices 4. In FIG. 2, the pellets progress through the shaft-furnace units 30, 31 and 32, and finally leave through the metering devices 4. If partially reduced pellets are, for example, supplied to hopper 1 directly from a sintering unit, for example of the type shown in U.S. Pat. No. 3,647,417 of Rolf Emil Wetzel et al., issued Mar. 7th, 1972, for a "Process for Producing Sponge Iron", then a gas-tight encapsulation of the feed area is provided.

After pellets reduced to completion are withdrawn through metering device 4, they move as sponge iron through a shaft 5 into electric furnace 6. Conduit lines 7 (in FIG. 1) and 8 (in FIG. 2) open into the shafts 5 for the introduction of hot cracked gas for protecting the sponge iron from reoxidation.

Following the electric furnace 6 is an alloying hearth 10 connected to a vacuum installation 9. Molten steel passes into the alloying hearth through the suction tube 11, because of the vacuum in the hearth. The combining of an alloying hearth with the electric furnace is especially advantageous in the present invention, because it allows the slag, which occurs generally in large amounts in the charging of the sponge iron into the electric furnace, to be continuously withdrawn from the electric furnace through a suitable conventional slag-tapping structure 12, without difficulties and without hindering the refining process. It is especially advantageous to direct the molten metal from the alloying hearth 10 directly into a continuous casting installation.

Referring now particularly to FIG. 1, the plant illustrated there includes two shaft-furnace units 3 situated alongside one another and arranged in parallel with respect to flow of iron ore pellets. The shaft-furnace units 3 are surrounded by insulated and heatable jackets 13. The heating gas for heating the jackets is fed to the shaft-furnaces 3 through the conduit lines 14 and is extracted through lines 15. In the case where the process of the present invention includes a nuclear reactor 40, the heating gas is, for example, helium. Any other economically usable heat source can be used. Even the use of fresh or used cracked gas as heating gas is possible.

The cracked gas necessary for the reduction is fed through conduit line 16 first to the shaft-furnace 3 in the left of FIG. 1, where iron ore pellets relatively nearer being reduced to completion are located. Upon leaving the shaft-furnace on the left, the cracked gas moves through conduit line 17 and a heat exchanger 18 into a scrubber 19, where it is cleaned of impurities and carbon dioxide. Leaving scrubber 19, the cracked gas, which has been cleaned and in the process cooled, is led back through heat exchanger 18 as a coolant and then into a heat exchanger 20 where it is again brought to reaction temperature. The reheated cracked gas moves through conduit line 21 then into the shaft-furnace 3 in the right of FIG. 1, where iron ore pellets in a less advanced stage of reduction, as compared with the pellets in the left furnace, are located. The dirty and used cracked gas leaving the shaft furnace in the right of FIG. 1 is then partly directed through a conduit line 7 into shaft 5 where it acts as a protective gas for sponge iron moving toward the electric furnace from the left shaft-furnace. The remainder of the dirty and used cracked gas leaving the right shaft-furnace 3 is sent to steam producer 22, where it is burned for the purpose of supplying heat for making steam. The resulting steam may drive vacuum installation 9, as shown.

With the cracked gas moving first into the left shaft-furnace 3, from conduit pipe 16 upwardly into the shaft-furnace, there will come a time when tests will indicate that specimen pellets withdrawn through metering device 4 show reduction to completion. Then, withdrawal of pellets, which when reduced to completion may be referred to as sponge iron, is done continuously through metering device 4 at a rate such that the cracked gas, flowing upwards and countercurrent to the pellet flow, assures that the pellets being withdrawn have been reduced to completion. In this way, a complete emptying of the left shaft-furnace may be effected. Alternatively, refilling of the left shaft-furnace may be begun through metering device 2 as soon as the continuous withdrawal through the metering device 4 of the left furnace is begun; in this alternative, it is then necessary to test, or calibrate, to determine when pellets in an only partially reduced state begin passing through metering device 4.

After a charge of material reduced to completion has moved through the left shaft-furnace 3, the preliminary reduction in the right shaft-furnace is stopped, and the cracked gas flow is changed such that it then first passes through the right shaft-furnace and secondly through the left shaft-furnace. This change is accomplished by closing valve 43 and opening valve 44. While cracked gas flow had been through the conduit lines drawn solid in FIG. 1, gas flow is now through the conduit lines drawn dot-dashed in FIG. 1. Valves in addition to valves 43 and 44 are present, but are not shown, since their locations and functions are obvious. Consequently, reduction to completion then takes place in the right shaft-furnace 3, while preliminary reduction is then taking place in the left shaft-furnace. The reduction can, when necessary, be divided into more than two stages, with three or more shaft-furnaces being placed in the same manner in parallel with one another and with provision for the changing of the gas flow as required.

Referring now particularly to FIG. 2, no changing of gas flow is necessary in that embodiment of the invention. The furnace units 30 to 32 are connected in series both with respect to material flow and with respect to cracked gas flow. Otherwise, this embodiment of the invention works in the same manner as does the embodiment of FIG. 1. In the embodiment of FIG. 2, there are shown two groups of furnace units 30 to 32, with the units of each group being connected in series. The question of how many of such groups to include in a plant is determined in the first place by the capacity of the electric furnace. Even only one of such groups can be used.

The three shaft-furnace units 30 to 32, which are situated one above the other and arranged in series, are surrounded by a common jacket 23. The shaft-furnace units are provided on their lower ends with a funnel 24, whose angle of inclination is determined by the material or its particular properties at the individual stages of the reduction. If necessary, this angle can be made adjustable. The stage heights of the separate shaft-furnace units 30 to 32 are determined by the load-bearing ability of the pellets, which in turn is determined by the composition and the condition of the pellets at any given time in the course of the reduction.

The flow path of the cracked gas in the embodiment of FIG. 2 is, in principle, the same as in the embodiment of FIG. 1. The corresponding conduit lines and other elements are given the same reference numerals in both embodiments. Conduit lines 25 are in the form of rings, which pass around the jackets 23 of the two groups of furnace units. Those conduits 25 which are at the same level (as measured up and down in FIG. 2) in the two groups are in communication with one another via conduit lines, but this has not been shown in every case so as not to hide the important general concepts. The gas which is exhausted from the electric furnace 6 is fed to the heat exchanger 20 and is later burned in the steam producer 22. The heat exchanger 20' of the second cleaning stage is, in contrast, connected in the heating gas circuit. Other measures can, however, be used, such as is indicated by the dot-dashed line 26 where heat may be supplied by burning, in burner 41, a portion of the used cracked gas.

Calcium carbide is fed to the electric furnace for the purpose of forming slag. The mixture of carbon monoxide and hydrogen forming in this process in the calcium carbide oven 27 may be used in the same way as the cracked gas by allowing it to move through conduit line 42 into line 16.

In the embodiment of FIG. 2, the pellets are in continual motion because of their moving from one unit into the other. This is advantageous for keeping them loose and preventing bonding and bridging between the pellets.

As will be clear from a reading of this disclosure, the present invention lies in the particular interrelationships of pellet and reducing gas flow. Thus, the knowledge already existent in the art as to the interrelationships of pellet characteristics, cracked gas composition, temperatures, etc., is sufficient to enable one skilled in the art to put the disclosed method and plant to use without undue experimentation. As is well known, a cracked gas consisting essentially of carbon monoxide and hydrogen and suitable for use in the present invention can be produced by heating natural gas in the presence of carbon dioxide. The carbon dioxide may be taken from the exhaust of a burning process and even from the exhaust from steam producer 22.

The following examples are further illustrative of the invention:

The iron ore chosen for the reduction process should have an iron content of at least 63%, in order to make the production of sponge iron possible having an iron content of nearly 90 to 95% iron metallic after the reduction. The chemical analysis of an ore suited for the process is given in Table 1. It is a Brazilian ore called Itabira Fines.

Table 1

| Component | Itabira Fine Ore % |
|---|---|
| Fe | 64.30 |
| FeO | 0.19 |
| $Fe_2O_3$ | 91.60 |
| Mn | 0.15 |
| P | 0.05 |
| $SiO_2$ | 4.99 |
| $Al_2O_3$ | 1.70 |
| CaO | 0.11 |
| MgO | 0.13 |

The pelletizing of iron ore fines with a binder like bentonite or the production of cold bonded pellets is well known to anyone skilled in the art. Reference is made to an appropriate book entitled "The Reduction of Iron Ores" by L. v. Bogdandy and H. J. Engell, published by Stahleisen 1971, Dusseldorf, Fed. Rep. of Germany (576 pp). It is also possible to charge burnt pellets into the reduction units. Burnt pellets like Hamersley pellets from Australia are available on the market. In Table 2 is given the chemical analysis of Hamersley pellets.

Table 2

| Component | Hamersley pellets % |
|---|---|
| Fe | 63.57 |
| P | 0.05 |
| $SiO_2+Al_2O_3$ | 9.02 |
| $TiO_2$ | 0.25 |

The charge of burnt pellets or the pelletizing of fine ores into green pellets — which must be fired or burnt before reduction — is only a question of economy.

The approximate composition of the cracked gas is given in Table 3 and the approximate composition of the gas after the first reduction stage and after cooling and washing before reheating is shown in Table 4.

Table 3

| Component | Cracked Gas % |
|---|---|
| $H_2$ | 70 |
| CO | 14 |
| $CO_2$ | 8 |
| $CH_4$ | 5 |
| $N_2$ | 2 |

Table 4

| Component | Second Stage Reduction Gas % |
|---|---|
| $H_2$ | 50 |
| CO | 14 |
| $CO_2$ | 18 |
| $N_2$ | 5 |
| $CH_4$ | 13 |

These compositions of the gases are given only as an example. Other compositions are possible depending on the reforming or cracking process for the cracked gas, the reduction process, and the ore quality for the second stage reduction gas. In this case reference is made to the literature cited above and to the book "Die Verarbeitung des Erdöles" by Bruno Riediger, published 1971 by Springer (1,088 pp.), Berlin-Heidelberg-New York.

The temperature of the gas entering the reduction furnace will be in the range of 850° to 1,150°C. In order to prevent clustering and brdging of the pellets during reduction the chosen temperature will be closer to about 900°C. If cold charging is performed the temperature of the iron ore pellets is like ambient temperature at the top of the furnace. In the case of prereducing and not charging of the prereduced material the charging temperature should not substantially exceed 500°C. The sponge iron leaving the furnace has at most the temperature of the gas fed to the shaft-furnace, i.e. at most approximate 1,150°C. Thus will also be the temperature of the material in the shafts which lead to the electric furnace.

According to J. G. Sibakin et al. in a paper entitled "Electric arc steelmaking with continuously charged reduced pellets" and read on the "International Congress on Production and Utilisation of Prereduced Iron Ore" at Evian, France, May 29–31, 1967, there exists a relationship between the energy input rate and the rate at which sponge iron can be continuously charged into an electric arc furnace. The feed rate depends on the quality of the sponge iron. If the sponge iron has a high iron content and a low and neutral gangue, a furnace of 40 MW e.g. can be fed at a rate of approximate 2,400 lb/min. A larger furnace will probably be fed at a higher rate.

The quality of the sponge iron is important. It is necessary that a high metallization is obtained in the advanced stage of reduction. In this stage the degree of metallization should reach 90 to 95% or more, while — if two stages of reduction are provided only — in the lower stage of reduction a degree of about 50% is sufficient which mostly depends on the quality of the reduction gas in the second stage. The physical properties of the sponge iron depend on the iron ore pellets charged in the reduction furnace. The pellet size can reach e.g. from 5 to 20 millimeters, preferably from 10 to 12 millimeters, and the bulk density of the reduced sponge iron ranges from 1.6 t/m$^3$ to 2.6 t/m$^3$, empirically 1.65 t/m$^3$ to 1.95 t/m$^3$. The flow rate of the ore in the reduction units depends on the reduction rate, that differs in each case and has to be determinated by preliminary trials.

It will be understood that the above description of the present invention is susceptible to various modifications, changes and adaptations, and the same are intended to be comprehended within the meaning and range of equivalents of the appended claims:

We claim:

1. A method for producing steel, comprising the steps of:
    a. jacket-heating a plurality of jacketed shaft-furnace units containing iron ore pellets;
    b. flowing a reducing gas through the plurality of jacket-heated shaft-furnace units containing iron ore pellets, always from a shaft-furnace unit containing iron ore pellets in a more advanced stage of reduction to a shaft-furnace unit containing iron ore pellets in a less advanced stage of reduction, by flowing a fresh reducing gas through a first unit containing iron ore pellets in an advanced stage of reduction, for directly reducing the iron ore pellets with the reducing gas; and withdrawing the reducing gas from said first unit and flowing it through a second of the plurality of units containing iron ore pellets in a less advanced stage of reduction than the pellets in said first unit for effecting a preliminary direct reduction of the pellets in the second unit;
    c. withdrawing pellets reduced to completion from the first unit;
    d. protecting the withdrawn pellets from the first unit with at least a part of said reducing gas from the last of the shaft-furnace units through which the reducing gas flows;
    e. feeding the withdrawn pellets from the first unit and protecting reducing gas together into an electric furnace;
    f. introducing into the first unit new iron ore pellets which are in a less advanced stage of reduction than the iron ore pellets in the second unit and changing the direction of flow of the fresh reducing gas so that it flows into the second unit for bringing about complete direct reduction of the preliminarily reduced iron ore pellets in the second unit and then into the first unit to effect a preliminary direct reduction of the new iron ore pellets in the first unit;
    g. withdrawing pellets reduced to completion from the second unit;
    h. protecting the withdrawn pellets from the second unit with at least a part of said reducing gas from the last of the shaft-furnace units through which the reducing gas flows;
    i. feeding the withdrawn pellets from the second unit and protecting reducing gas together into the electric furnace;
    j. introducing into the second unit new iron ore pellets which are in a less advanced stage of reduction than the iron ore pellets in the first unit; and
    k. again changing the direction of flow of the fresh reducing gas so that the fresh reducing gas flows into the first unit containing iron ore pellets that have been preliminarily reduced and are ready for complete reduction by the fresh reducing gas.

2. A method as claimed in claim 1, wherein the gas flow direction in the step of flowing is countercurrent to pellet flow in the step of withdrawing.

3. A method as claimed in claim 1, wherein said reducing gas is cracked gas.

4. A method as claimed in claim 1, wherein the step of flowing includes the step of scrubbing impurities and carbon dioxide from the reducing gas always after its emergence from a more advanced unit and before its introduction into a less advanced unit.

5. A method as claimed in claim 4, wherein the step of flowing further includes reheating scrubbed gas with heat from the electric furnace.

6. A method as claimed in claim 4, wherein the step of flowing further includes reheating scrubbed gas with heat from a nuclear reactor.

7. A method as claimed in claim 1, wherein the step of flowing includes heating the jackets of said units with heat from a nuclear reactor.

8. A method as claimed in claim 1 wherein the iron ore pellets are fed through the shaft-furnace units in parallel, each shaft-furnace having a conduit for feeding the iron ore pellets into the electric furnace, and the reducing gas for protecting withdrawn pellets from one of said shaft-furnace units is supplied to the conduit for said one shaft-furnace unit from another of said shaft-furnace units.

* * * * *

UNITED STATES PATENT OFFICE
CERTIFICATE OF CORRECTION

PATENT NO. : 3,864,122
DATED : February 4th, 1975
INVENTOR(S) : Henri F. Seelig et al It is certified that error appears in the above-identified patent and that said Letters Patent are hereby corrected as shown below:

In the heading of the patent, under [75] Inventors:, change the inventors' names to read:
--Henri F. Seelig, Essen; Herbert Ritter von Waclawiczek, Duisburg, both of Germany--; under [57] Abstract, line 13, change "reduction" to --reducing--.

Column 3, line 54, before "metering" delete "the".

Column 6, line 32, change "brdging" to --bridging--; line 37, change "not" to --hot--.

Signed and Sealed this twenty-ninth Day of July 1975

[SEAL]

Attest:

RUTH C. MASON
Attesting Officer

C. MARSHALL DANN
Commissioner of Patents and Trademarks